Nov. 6, 1934.  W. W. CARSON, JR  1,979,732
PLURAL UNIT HEAT EXCHANGER
Filed July 29, 1932
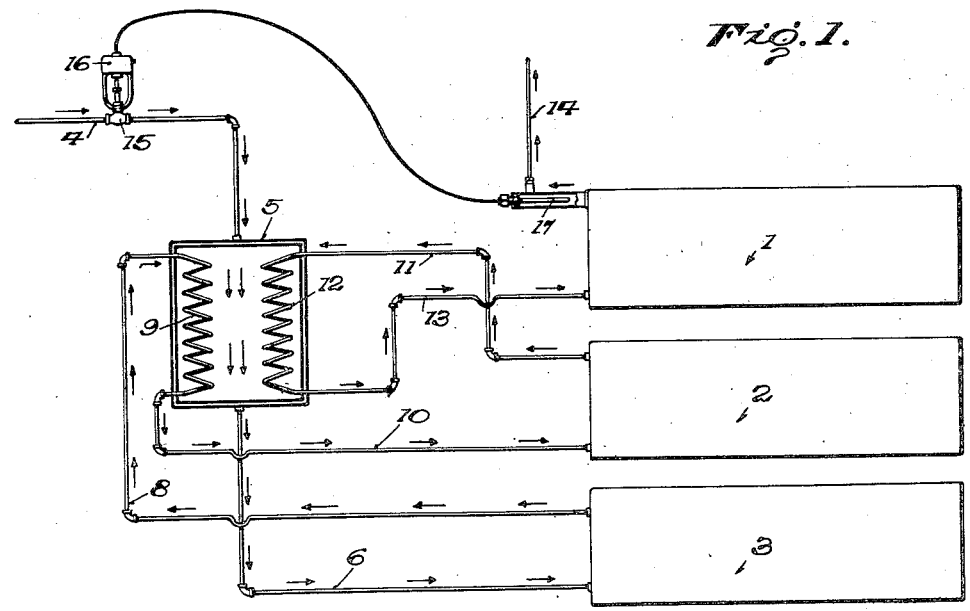
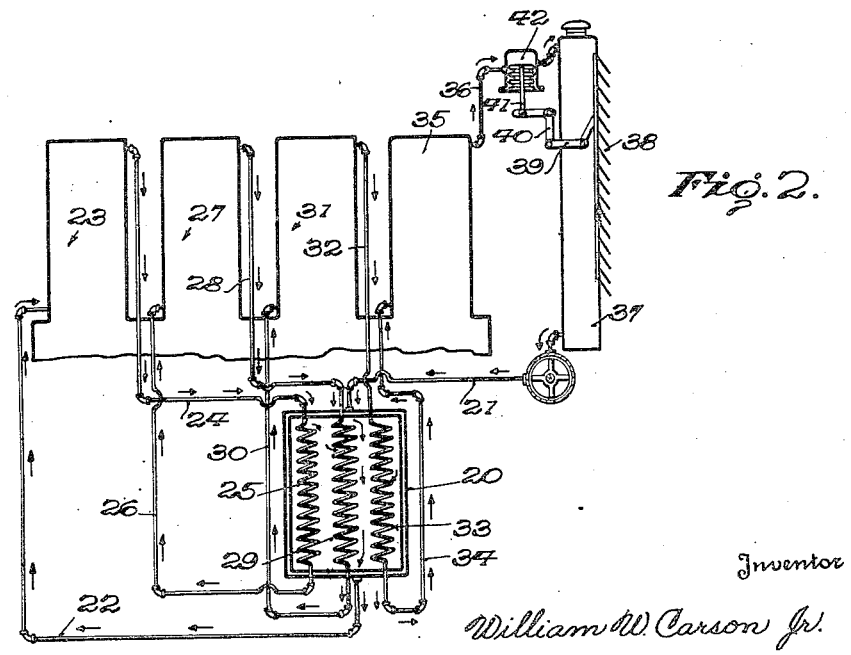
Inventor
William W. Carson Jr.
By Cameron, Kerkam & Sutton
Attorneys Patented Nov. 6, 1934

1,979,732

UNITED STATES PATENT OFFICE 1,979,732

PLURAL UNIT HEAT EXCHANGER

William W. Carson, Jr., Knoxville, Tenn., assignor to The Fulton Sylphon Company, Knoxville, Tenn., a corporation of Delaware Application July 29, 1932, Serial No. 626,066

22 Claims. (Cl. 257—2)

This invention relates to heat interchangers, and more particularly to a method for the interchange of heat between a plurality of units to be heated or cooled and a fluid medium predeterminately circulated into heat interchanging relation therewith. The invention will be described in connection with the cooling of a plurality of units, as by circulating cooling water, brine, or any other suitable cooling fluid, into heat interchanging relation with a plurality of units to be cooled, but it is to be expressly understood that the invention is equally applicable to the heating of a plurality of units, as by circulating hot water or other suitable heating fluid into heat interchanging relation with a plurality of units to be heated.

It has heretofore been proposed to circulate a medium in heat interchanging relation with a plurality of units in series and to control the flow of said medium so as to maintain a predetermined temperature at the outlet from said series, but experience has demonstrated that an equal heat flow is not obtained at each unit because of variations in the temperature differential at the respective units. It has also been proposed to circulate the medium through the units in parallel, but this has not proved entirely satisfactory because of inefficient use of the medium if a small temperature differential is maintained or because of excessive temperature change if a large temperature differential is maintained, while it has frequently been found necessary to use a thermostatic control for each unit.

It is an object of this invention to provide a method and system for heating or cooling a plurality of units wherein the aforesaid objections may be overcome; wherein the heating or cooling fluid may be used efficiently, and yet without a large change in the temperature while in heat interchanging relation with any one unit, and wherein, at the same time, an equal change in the temperature of the heating or cooling fluid may be obtained at each unit.

Another object of this invention is to provide a method and system for heating or cooling a plurality of units which tend to minimize the effect of fluctuations of inlet temperature of said medium in its effect on each of the units.

Another object of this invention is to provide a method and system for heating or cooling a plurality of units which, while of particular utility when used in conjunction with a thermostatic regulation of the temperature, have utility when used without a thermostatic control, because of its tendency to minimize the effect of fluctuations in the temperature of the heating or cooling medium.

Another object of this invention is to provide a method and system for heating or cooling a plurality of units wherein substantially equal amounts of heat are exchanged at each of the units.

Another object of this invention is to provide a method and system for heating or cooling a plurality of units wherein the exchange of heat takes place between substantially the same limits of temperature at all of the units.

Another object of this invention is to provide a method and system for heating or cooling a plurality of units wherein the heating or cooling medium is used efficiently and can be accurately controlled as to its temperature by a single thermostat and yet equal volumes of said medium flow past each of said units and exchange heat therewith between the same limits of temperature, so that while the total change of temperature of said medium may be the same as exists in the series operation heretofore used, the individual change at all of the units is substantially equal.

Other objects will appear as the description of the invention proceeds.

The invention is capable of receiving a variety of mechanical expressions and of being carried out in a variety of ways, and it is susceptible of use in a wide variety of arts where a plurality of units are to be cooled or heated by substantially equal amounts as in cooling the cylinders of an air compressor or an engine, or the sections of a mercury arc rectifier, or in heating a plurality of vessels or chambers to a substantially uniform temperature, etc. The accompanying drawing shows diagrammatically two embodiments of the invention applied to the cooling of a plurality of units, but it is to be expressly understood that the drawing is for purpose of illustration only and is not to be construed as a definition of the limits of the invention, reference being had to the appended claims for that purpose.

Referring in detail to the drawing, wherein the same reference characters are used to designate corresponding parts in the several figures, Fig. 1 illustrates an embodiment of the invention wherein three units are heated or cooled and the heating or cooling medium is regulated by a thermostatically controlled valve in the inlet for the heating or cooling medium, and Fig. 2 illustrates an embodiment of the invention wherein four units are heated or cooled and the heating or cooling effect is regulated by a thermostatically operated damper or shutter controlled from the temperature of the heating or cooling medium.

In the form shown in Fig. 1, the units 1, 2 and 3 may be taken as typical of any suitable units to be cooled, as for example, cylinders of an engine where substantially equal amounts of heat are generated in each of the cylinders. While three units have been selected for purposes of illustration, however, it will be understood that this number may be varied within wide limits. The cooling medium, as water for example, is admitted through an inlet pipe 4 through which it flows into a heat exchanger 5. From said heat exchanger 5 the cooling medium flows through conduit 6 to the jacket of the unit 3, and leaving the jacket 3 it flows through conduit 8 to the inlet of a suitable coil 9 disposed in said heat exchanger 5. From the outlet of the coil 9 the cooling medium flows in series through the conduit 10 to the inlet of the jacket for the unit 2, and from the outlet of said jacket the cooling medium flows through conduit 11 to the inlet of a suitable coil 12 disposed in said heat exchanger 5. From the outlet of said coil 12 the cooling medium flows in series through conduit 13 to the inlet of the jacket for unit 1, and from the latter it flows to waste, or through any suitable cooling means where recirculation is desired, through conduit 14.

Disposed within the inlet conduit 4 is any suitable valve 15 controlled by the motor element 16 of any suitable thermostat, here shown as including a bulb 17, which is subjected to the temperature of the cooling medium in the outlet conduit 14.

The amount of cooling medium admitted to the system is therefore determined thermostatically by the temperature of the medium leaving the system, and the total temperature change in said medium within the system can be determined so as to bring said medium to the desired final temperature in conformity with the desired temperature range of the medium in performing its heat exchanging function. The coils 9 and 12 are of sufficient size, character and capacity to assure that the medium within the heat exchanger 5 and the coils 9 and 12 will be brought to substantially the same temperature at the outlets from said heat exchanger and said coils, and it will be noted that the general direction of flow through the heat exchanger and the coils 9 and 12 is the same, so that their outlets are contiguous and in the heat exchanging function here performed the cooling medium is brought to substantially the same temperature before entering the inlet conduits 6, 10 and 13 of the respective units 3, 2 and 1.

Assuming, as in the example above discussed, that the inlet water has a temperature of 5° C. and that it is desired to maintain an outlet temperature of 50° C., the system as described results in a 15° change of temperature at each of the units 1, 2 and 3, but each of said units is operating between the temperatures of 35° C. and 50° C. While the water entering the heat exchanger 5 is at 5° C., it abstracts from the coils 9 and 12 heat which has been previously abstracted from the cylinders 2 and 3, and leaves the heat exchanger at the temperature of 35° C. After flowing through the unit 3 the water has attained a temperature of 50° C., but it is cooled within the coil 9 to a temperature of 35° C., and at that temperature enters unit 2. Here again it is heated to a temperature of 50° C., but it is cooled in the coil 12 to a temperature of 35° C., at which temperature it enters the unit 1, to be again heated to the temperature of 50° C., as maintained by the thermostatic control.

Therefore, the water entering the heat exchanger, by abstracting heat from the water that has already flowed into heat interchanging relation with two of the units, is brought to the inlet temperature of the water for said two units, and as all of the water leaving the heat exchanger 5 and its coils 9 and 12 has the same inlet temperature as respects the units 1, 2 and 3, while the outlet temperature of the system is predetermined by the thermostat in the outlet of the final unit of the series, all of the units are made to work within the same temperature range, which is only a fraction of the total range of the cooling medium. Thus the cooling medium is brought to the same inlet and outlet temperatures at each of the units, while the total range of said cooling medium is the range at each unit multiplied by the number of units. At the same time, the amount of cooling medium used is no greater than that heretofore used where the medium was caused to flow through the several units in simple series, and only a single thermostat is required to maintain the predetermined temperature in the outlet. Therefore the desired uniformity of action and range of temperatures in heat abstraction is obtained at all of the units.

In the form shown in Fig. 2 the same principle is shown in conjunction with the cooling of four units, but in this embodiment the medium is recirculated. The cooling medium, as water, flows into the heat exchanger 20 through conduit 21 and from said heat exchanger flows through conduit 22 to unit 23. From said unit the cooling medium flows in sequence through the conduit 24, coil 25, conduit 26, unit 27, conduit 28, coil 29, conduit 30, unit 31, conduit 32, coil 33, conduit 34, unit 35 and outlet conduit 36. From the latter conduit the cooling medium flows through any suitable cooling unit, as a radiator 37, from which it returns to the inlet conduit 21, and a pump may be provided in said conduit to assure proper circulation. To control the cooling effect of the system described, said radiator is provided with any suitable damper or shutter mechanism 38 operatively connected through the link 39 and bell crank 40 to the stem 41 of any suitable thermostat 42 subjected to the temperature of the medium in the outlet conduit 36.

As in the embodiment previously described the temperature attained by the cooling medium is thermostatically controlled so as to maintain a predetermined temperature therein, while the cooling medium, being caused to pass in series through the heat exchanger and the coils therein, and flowing in the same direction relatively through said exchanger and coils, is brought to a uniform intermediate temperature at the inlet to each of the units, while at the outlet of each of the units the temperature of the cooling medium is brought to that predetermined by the thermostat.

It will therefore be perceived that the several objects heretofore set out have been attained by the method and system of the present invention. While it is preferred to use this method and system in conjunction with a thermostatic control to maintain a predetermined temperature in the outlet of the heating or cooling system it will be perceived that the present invention has advantages even though no thermostat is employed, because of its tendency to equalize the inlet and outlet temperatures of the respective units. Moreover, it will be perceived that the present system minimizes the effect of fluctuations in the inlet temperature of the heating or cooling medium. Thus in the system of Fig. 1 if the inlet temperature should be increased from 5° C. to 10° C. the unit 3 would not have its inlet temperature increased 5° as in systems heretofore employed, whether the fluid be caused to pass through the units in series or in parallel, but by reason of the equalizing action of the heat exchanger and its coils the fluctuation of the inlet temperature of any one unit would be only the fluctuation in the temperature of the medium at the inlet divided by the number of units. Hence the present system can be used satisfactorily with only one thermostatic control even though there may be considerable fluctuation in the inlet temperature.

While the embodiments of the invention illustrated on the drawing have been described with considerable particularity, it is expressly understood that the invention is not restricted thereto. As will be readily appreciated by those skilled in the art, changes may be made in the manner in which the method and principle are employed, in the number of units, in the manner in which the temperature of the heating or cooling medium is controlled, in the form and character of the heat exchanger and coils, in the units to be heated or cooled, and in the details of construction and arrangement and proportion of the parts without departing from the spirit of this invention. Reference is therefore to be had to the appended claims for a definition of the invention.

What is claimed is:

1. The method of changing the heat content of a plurality of units which consists in alternately circulating a medium through a heat exchanger and then through one of said units with said medium as it flows to the first of said units through said heat exchanger in heat interchanging relation with and flowing in relatively the same direction as said medium as it flows through said heat exchanger to each of the other units to bring said medium to a substantially uniform inlet temperature at all of said units.

2. The method of changing the heat content of a plurality of units which consists in circulating a medium in series through said units and through a heat exchanger to bring said medium to a substantially uniform inlet temperature at each of said units, and thermostatically controlling the final temperature attained by said medium.

3. The method of changing the heat content of a plurality of units which includes circulating a medium into heat interchanging relation therewith in series and utilizing the temperature attained by said medium in each of said units except the last of the series for preliminarily heating said medium before coming into heat interchanging relation with the first of said series by flowing said medium in heat interchanging relation and relatively in the same direction to provide a substantially uniform inlet temperature at all of said series.

4. The method of changing the heat content of a plurality of units which includes circulating a medium into heat interchanging relation therewith in series and utilizing the temperature attained by said medium in each of said units except the last of the series for preliminarily heating said medium before coming into heat interchanging relation with the first of said series to provide a substantially uniform inlet temperature at all of said series, and thermostatically controlling the temperature of said medium at the outlet of said series.

5. The method of changing the heat content of a plurality of units which includes circulating a medium into heat interchanging relation with said units in series and exchanging heat between the circulating medium approaching and leaving the respective units, and controlling the rate of admission of said medium to said series to maintain a substantially uniform range of temperature of said medium at all of said series.

6. The method of changing the heat content of a plurality of units which includes circulating a medium into heat interchanging relation with said units in series, exchanging heat between the circulating medium approaching and leaving the respective units and controlling the rate of admission of said medium to said series to maintain substantially the same upper and lower limits of temperature of said medium at all of said series.

7. The method of changing the heat content of a plurality of units which includes circulating a medium in alternation through a heat exchanger and in heat exchanging relation with each of said units in series and controlling the rate of flow of said medium to substantially uniformize the temperature of said medium as it flows into heat exchanging relation with each of said units.

8. The method of changing the heat content of a plurality of units which includes circulating a medium in alternation through a heat exchanger and each of said units in series while controlling the rate of flow of said medium to substantially uniformize the inlet and outlet temperatures of said medium at each of said units.

9. The method of changing the heat content of a plurality of units which includes circulating a medium in alternation through a heat exchanger and each of said units in series to substantially uniformize the inlet temperature at each of said units and regulating the admission of said medium to the first of said series to maintain a predetermined temperature of said medium at the outlet of the last of said series.

10. The method of changing the heat content of a plurality of units which includes circulating a medium in alternation through a heat exchanger and each of said units in series to substantially uniformize the inlet temperature at each of said units and thermostatically maintaining a substantially uniform temperature at the outlet of each of said units.

11. In a heat interchanging system, in combination with a plurality of units whose temperature is to be changed, a circulating system including a heat exchanger individual to and in heat interchanging relation with each of said units said heat exchanger being connected in series, a heat exchanger in the inlet to the heat exchanger for the first of said units and in heat exchanging relation with the inlet to the heat exchanger for each of the succeeding units of the series, and means in the inlet to said last named exchanger for predetermining the rate of flow of the medium through all of said exchangers.

12. In a heat interchanging system, in combination with a plurality of units whose temperature is to be changed, a circulating system including all of said units in series, a heat exchanger in the inlet to the first of said units and in heat exchanging relation with the inlet to each of the succeeding units of the series, and thermostatic means for determining the temperature of said medium at the outlet of said series.

13. In a heat interchanging system, in combination with a plurality of units whose temperature is to be changed, a system for circulating a medium through said units in series and including a heat exchanger common to the inlet conduits of all of the units of the series and in which the inlet to the first unit of the series is in heat interchanging relation with the inlet to each of the remaining units in the series, said medium flowing through said exchanger in relatively the same direction.

14. In a heat interchanging system, in combination with a plurality of units whose temperature is to be changed, a system for circulating a medium through said units in series and including a heat exchanger in the inlet conduits of all of the units of the series, and thermostatic means associated with the outlet of the last of the series and controlling the inlet to the first of the series for predetermining the final temperature attained by said medium in said system.

15. In a system for interchanging heat, in combination with a plurality of units whose temperature is to be changed, a heat exchanger associated with and in heat interchanging relation with each of said units, a system for circulating a medium through said heat exchangers in series, a heat exchanger provided with a like plurality of paths through which the medium may be circulated and wherein the inlet to the first of said first-named heat exchangers is in heat interchanging relation with the inlet to each of the other of said first-named heat exchangers in said series and said paths being so arranged that said medium flows therethrough in relatively the same direction whereby the outlet temperature of the medium flowing from said second-named heat exchanger in each of said paths is substantially uniform.

16. In a system for interchanging heat, in combination with a plurality of units whose temperature is to be changed, a heat exchanger associated with and in heat interchanging relation with each of said units, a system for circulating a medium through said heat exchangers in series, a heat exchanger provided with a like plurality of paths through which the medium may be circulated, one of said paths being in the inlet to each of said heat exchangers, and thermostatic means for controlling the admission of said medium to the first unit of said series.

17. In a system for interchanging heat, in combination with a plurality of units whose temperature is to be changed, a system for circulating a medium through said units in series, a heat exchanger provided with a like plurality of paths through which the medium may be circulated, one of said paths being in the inlet to each of said units and said paths being so arranged that said medium flows therethrough in relatively the same direction whereby the outlet temperature of the medium flowing from said heat exchanger in each of said paths is substantially uniform, and thermostatic means for maintaining a substantially uniform temperature at the outlet of said series.

18. In a system for interchanging heat, in combination with a plurality of units whose temperature is to be changed, a system for circulating a medium in heat interchanging relation with said units in series and including a heat exchanger in the inlet of the first of said series and having therein in heat interchanging relation with the medium flowing to the inlet of the first of the series a conduit in the inlet of each of the succeeding units of said series, said medium flowing through said heat exchanger and each of said conduits in relatively the same direction whereby said medium must flow through said heat exchanger and attain a substantially uniform temperature before entering any of the units of said series.

19. In a system for interchanging heat, in combination with a plurality of units whose temperature is to be changed, a system for circulating a medium in heat interchanging relation with said units in series and including a heat exchanger in the inlet of the first of said series and having therein a conduit in the inlet of each of the succeeding units of said series, whereby said medium must flow through said heat exchanger before entering any of the units of said series and the medium flowing to the first of the series in heat interchanging relation with the medium flowing to the remainder of the series, said conduits being so arranged in said heat exchanger that their outlets are contiguous to the outlet of said heat exchanger.

20. In a system for interchanging heat, in combination with a plurality of units whose temperature is to be changed, a system for circulating a medium in heat interchanging relation with said units in series and including a heat exchanger common to the inlets of all of said units, a valve in the inlet of said system, and thermostatic means for operating said valve subjected to the outlet temperature of said system.

21. In a system for interchanging heat, in combination with a plurality of units whose temperature is to be changed, a system for circulating a medium in heat interchanging relation with said units in series and including a heat exchanger common to the inlets of all of said units, and thermostatically controlled means subjected to the temperature of the outlet of said system for predeterminately controlling the temperature of said medium.

22. In a system for interchanging heat, in combination with a plurality of units whose temperature is to be changed, a system for circulating a cooling medium in heat interchanging relation with said units in series and including a heat exchanger common to the inlets of all of said units, and means for controlling the cooling effect of said system including thermostatically controlled means subjected to the temperature of the outlet of said system for predeterminately operating said means.

WILLIAM W. CARSON, Jr.